US008380194B2

(12) United States Patent
Gossain et al.

(10) Patent No.: US 8,380,194 B2
(45) Date of Patent: Feb. 19, 2013

(54) SYSTEM AND METHOD FOR PROVIDING NETWORK ACCESS TO ELECTRONIC DEVICES

(75) Inventors: Hrishikesh Gossain, Heathrow, FL (US); Robin U. Roberts, Orlando, FL (US); Manish Shukla, Altamonte Springs, FL (US); Sekhar V. Uppalapati, Longwood, FL (US); Phuoc Tang, Sanford, FL (US); Jeffrey C. Schmidt, Orlando, FL (US); Mario Camchong, Oviedo, FL (US); Peter Stanforth, Winter Springs, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 0 days.

(21) Appl. No.: 13/160,951

(22) Filed: Jun. 15, 2011

(65) Prior Publication Data
US 2011/0306364 A1   Dec. 15, 2011

Related U.S. Application Data

(60) Provisional application No. 61/354,931, filed on Jun. 15, 2010.

(51) Int. Cl.
*G06F 15/173* (2006.01)
*H04W 64/00* (2009.01)
(52) U.S. Cl. ........................ 455/435.2; 455/433; 455/411
(58) Field of Classification Search .... 455/414.1–414.4, 455/421, 422.1, 432.1–445, 450–452.2, 456.1–457; 370/328–338
See application file for complete search history.

(56) References Cited

U.S. PATENT DOCUMENTS

| | | | |
|---|---|---|---|
| 5,608,727 A | 3/1997 | Perreault et al. | |
| 5,729,531 A | 3/1998 | Raith et al. | |
| 6,038,449 A * | 3/2000 | Corriveau et al. | 455/439 |
| 6,061,337 A * | 5/2000 | Light et al. | 370/331 |
| 6,161,015 A * | 12/2000 | Birchler et al. | 455/440 |
| 7,088,997 B1 | 8/2006 | Boehmke | |
| 7,460,837 B2 | 12/2008 | Diener | |
| 2003/0032399 A1 | 2/2003 | Slupe | |
| 2004/0003060 A1 | 1/2004 | Asoh et al. | |
| 2004/0087310 A1 | 5/2004 | Williamson et al. | |
| 2004/0127252 A1 | 7/2004 | Tsunomoto et al. | |
| 2006/0031082 A1 | 2/2006 | Amaitis et al. | |
| 2006/0083205 A1 | 4/2006 | Buddhikot et al. | |
| 2006/0143111 A1 | 6/2006 | Mylet | |
| 2006/0182169 A1 | 8/2006 | Belge et al. | |
| 2006/0234713 A1 | 10/2006 | Oswal et al. | |
| 2007/0207750 A1 | 9/2007 | Brown et al. | |
| 2008/0022003 A1 * | 1/2008 | Alve | 709/229 |
| 2008/0108365 A1 | 5/2008 | Buddhikot et al. | |

(Continued)

OTHER PUBLICATIONS

Jones, Steven K. et al., "Initial Evaluation of the Performance of Prototype TV-Band White Space Devices", (2007), OET Report, FCC/OET 07-TR-1006.

(Continued)

*Primary Examiner* — Kamran Afshar
*Assistant Examiner* — Kashif Siddiqui
(74) *Attorney, Agent, or Firm* — Renner, Otto, Boisselle & Sklar, LLP (57) ABSTRACT

Systems and methods of providing network access information from one or more servers to a wireless device. The wireless device acquires information from the servers about available networks at a current location of the wireless device. The network information is based on a plurality of device parameters, network parameters and regulatory requirements that govern the operation of the wireless device. In addition, the wireless device may assess the acquired information for suitability for communications to be carried out by the wireless device.

3 Claims, 5 Drawing Sheets

U.S. PATENT DOCUMENTS

| | | | |
|---|---|---|---|
| 2008/0151743 | A1 | 6/2008 | Tong et al. |
| 2008/0183634 | A1 | 7/2008 | Sadler |
| 2008/0186882 | A1 | 8/2008 | Scherzer et al. |
| 2008/0221951 | A1 | 9/2008 | Stanforth et al. |
| 2008/0222019 | A1 | 9/2008 | Stanforth et al. |
| 2008/0222021 | A1 | 9/2008 | Stanforth et al. |
| 2009/0028082 | A1 | 1/2009 | Wynn et al. |
| 2009/0046625 | A1 | 2/2009 | Diener et al. |
| 2009/0093247 | A1 | 4/2009 | Srinivasan |
| 2009/0197627 | A1 | 8/2009 | Kuffner et al. |
| 2010/0063854 | A1 | 3/2010 | Purvis et al. |
| 2011/0092185 | A1* | 4/2011 | Garskof .................. 455/411 |
| 2012/0088454 | A1* | 4/2012 | Stanforth et al. .......... 455/67.11 |

OTHER PUBLICATIONS

Kwerel, Evan et al., "A Proposal for a Rapid Transition to Market Allocation of Spectrum", Federal Communications Commission, 2002, OPP Working Paper No. 38, pp. 1-50.

By the Commission, "Second Report and Order, Order on Reconsideration, and Second Further Notice of Proposed Rulemaking", Federal Communications Commission, 2004, FCC 04-167, WT Docket No. 00-230, pp. 1-180.

Prabhu, Krish et al., "Time for Action" Genuine Ideas, 2002, [retrieved online Feb. 1, 2008], <http://www.genuineideas.com/ArticlesIndex/TimeForAction.htm>.

FCC 08-260, Second Report and Order and Memorandum Opinion and Order, Adopted Nov. 4, 2008 and Released Nov. 14, 2008.

"Digital Dividend: Cognitive Access, Consultation on License-Exempting Cognitive Devices using Interleaved Spectrum", Ofcom, Publication Date: Feb. 16, 2009.

U.S. Spectrum Management Policy: Agenda for the Future, 1991.

Radio Spectrum Management, Module 5 of ICT Regulation Toolkit, ITU, 2007.

International Search Report and Written Opinion from corresponding International Application No. PCT/US11/40480, dated Nov. 30, 2011.

47 C.F.R. 15.713, dated Feb. 17, 2009, as amended at 75 FR 75840, Dec. 6, 2010.

McKnight, Lee et al., "Best Effort versus Spectrum Markets: Wideband and Wi-Fi versus 3G MVNOs?", pp. 1-18, Presentation at 29th Annual TPRC, Oct. 27-29, 2001.

\* cited by examiner

SYSTEM AND METHOD FOR PROVIDING NETWORK ACCESS TO ELECTRONIC DEVICES

RELATED APPLICATION DATA

This application claims the benefit of U.S. Provisional Patent Application No. 61/354,931 filed Jun. 15, 2010, the disclosure of which is herein incorporated by reference in its entirety.

TECHNICAL FIELD OF THE INVENTION

The technology of the present disclosure relates generally to electronic devices and, more particularly, to a system and method for providing network access to electronic devices using database knowledge of network availability.

BACKGROUND

Wireless electronic devices, especially those with a high degree of portability while in use, are becoming increasingly popular. But a challenge for these devices is providing reliable network access.

SUMMARY

To improve communications capability of portable electronic devices, the present disclosure describes systems and methods of providing network access information to a wireless device (also referred to as a mobile station or MS) with the assistance of one or more network data servers. A network data server will sometimes be referred to in this document as a database (DB) due to the database services and capabilities of the server. The wireless device acquires information from the servers about available networks at a current location of the wireless device. The network information is based on a plurality of device parameters, network parameters and regulatory requirements that govern the operation of the wireless device. In addition, the wireless device may assess the acquired information for suitability for communications to be carried out by the wireless device.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

DETAILED DESCRIPTION OF EMBODIMENTS

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

In the present document, embodiments are described primarily in the context of a portable wireless radio communications device, such as the illustrated mobile electronic device. For purposes of description, the mobile electronic device may be a mobile telephone. It will be appreciated, however, that the exemplary context of a mobile telephone is not the only operational environment in which aspects of the disclosed systems and methods may be used. The disclosed systems and methods may be applied to portable electronic devices and/or to fixed location electronic devices, so long as the device has wireless radio communications capability. Therefore, the techniques described in this document may be applied to any type of appropriate electronic device, examples of which include a mobile telephone, a media player, a gaming device, a computer, a pager, a personal digital assistant (PDA), an electronic book reader, etc.

Figure 1:
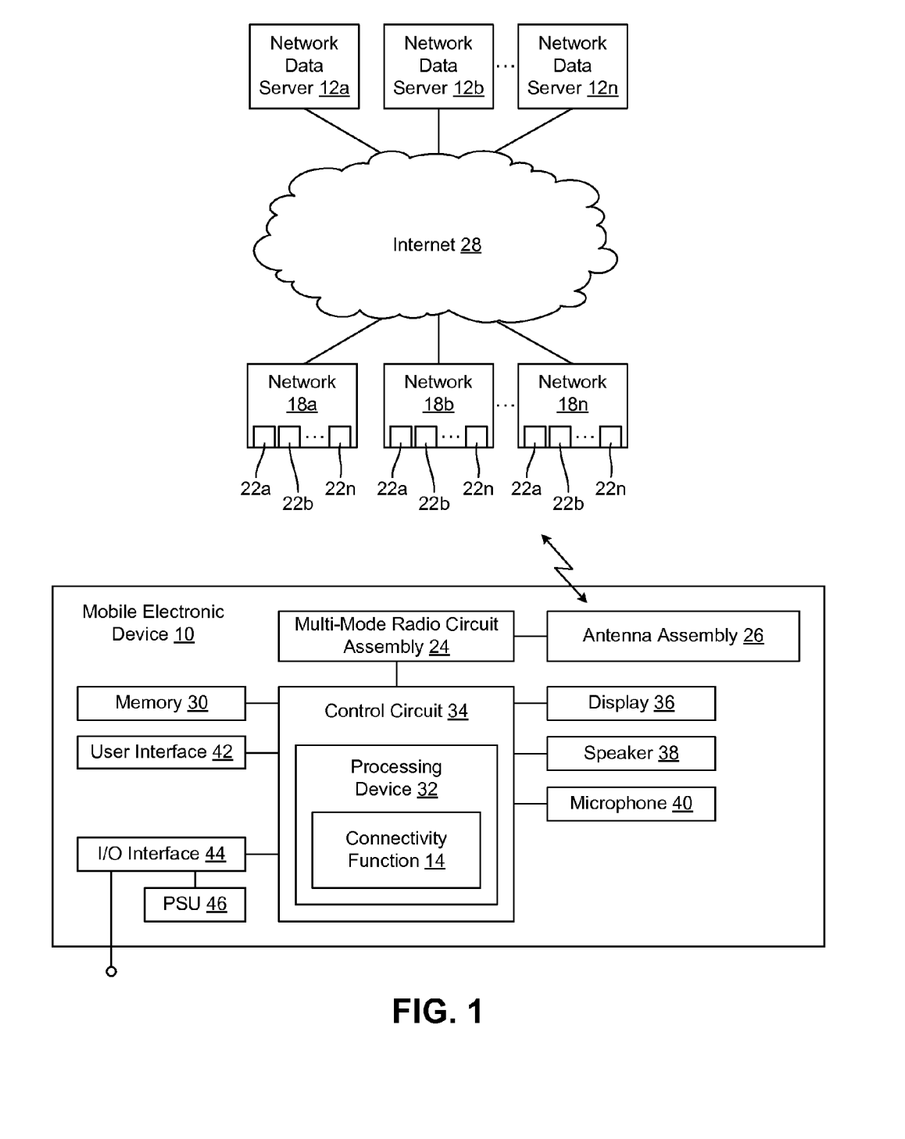
FIG. 1 is a schematic view of a communication system that includes an electronic device and at least one network data sever.
Figure 2:
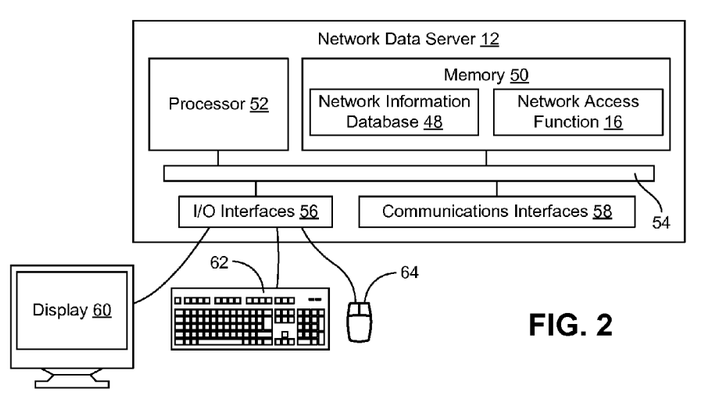
FIG. 2 is a schematic block diagram of an exemplary network data server.

Referring initially to FIG. 1, shown is a system that includes an electronic device 10 and a plurality of network data servers 12, labeled as servers 12a through 12n. The electronic device 10 is portable and has wireless communication capabilities as will be described in greater detail below. The network data servers 12 may be configured as server devices that communicate with the electronic device 10, as will also be described. The electronic device 10 may include a connectivity function 14 and the servers 12 each may include a network access function 16 (FIG. 2). The connectivity function 14 and the network access function 16 may cooperate with each other to assist the electronic device 10 in identifying one or more available networks 18 (labeled as networks 18a through 18n) and establish wireless communications with one of the networks 18 so as to carry out wireless communications with other devices (not shown) through the network 18.

Each of the connectivity function 14 and the network access function 16 may be embodied as executable instructions (e.g., referred to in the art as code, programs, or software) that are respectively resident in and executed by the electronic device 10 and the network access management system 12. The functions 14 and 16 each may be one or more programs that are stored on respective non-transitory computer readable mediums, such as one or more memory devices (e.g., an electronic memory, a magnetic memory, or an optical memory). In the following description, an ordered logical flow for the functionality of the connectivity function 14 and network access function 16 is described. But it will be appreciated that the logical progression may be implemented in an object-oriented or a state-driven manner.

In addition to executable instructions, the server 12 may store a network information database 48 (FIG. 2) in non-transitory computer readable medium (e.g., memory). The database 48 may contain information about the availability and capabilities of one or more the networks 18 by location. Each network 18 may include one or more connectivity devices 22 (labeled as 22a through 22n). The connectivity devices 22 may be, for example, base stations (BS) or access points (AP) as are appropriate for the corresponding network 18.

The electronic device 10 may be configured as a multimode device to carry out wireless communications using plural connectivity options, including carrying out communications on different frequencies and with different protocols. For this purpose, the electronic device 10 may include communications circuitry in the form of a multi-mode radio circuit assembly 24 and an antenna assembly 26. The radio circuit assembly 24 and the antenna assembly 26 represent circuitry to communicate over more than one type of communication interface (e.g., communicate with different types of networks 18 as described below). Therefore, the illustrated components represent one or more than one radio transceivers, depending on capabilities of the implementing hardware to tune to multiple frequencies and carry out communications using multiple protocols.

For example, the electronic device 10 may be configured for interaction with a mobile telephone network in the form of a cellular communications network. One or more the networks 18 may be cellular communications network. Exemplary cellular communications networks include, by are not limited to, networks operating in accordance with global system for mobile communications (GSM), wideband code division multiple access (WCDMA), integrated services digital broadcasting (ISDB), high speed packet access (HSPA), or any other appropriate standard or advanced versions of these standards. The cellular communications networks may be compatible with 3G and/or 4G protocols. Therefore, the appended figures may refer to a cellular communication network using 3G and/or 4G designators, but it will be appreciated that such networks are not limited to these protocols. For cellular communication networks the connectivity devices 22 may be communications base stations that are strategically deployed to establish communications between the network 18 and the electronic device 10. The communications base stations are typically in the form of cellular service towers, or "cell" towers. The cellular communications network may further include one or more servers (not shown) for supporting the communications activity of the electronic device 10 and other electronic devices 10, such as managing calls placed by and destined to the electronic device 10, transmitting data to and receiving data from the electronic device 10, and carrying out any other support functions.

The electronic device 10 also may be configured to communicate with other types of networks 18, such as a packet-switched network. Exemplary packet-switched networks include, but are not limited to, a network configured in accordance with IEEE 802.11 (e.g., IEEE 802.11a, IEEE 802.11b, or IEEE 802.11n), each of which are commonly referred to as WiFi. The appended figures may refer to a packet-switched network using the designation 802.11, but it will be appreciated that such networks are not limited to this protocol. Therefore, it will be appreciated that WiFi is not the only alternative network type to cellular communications networks. For example, a network in accordance with IEEE 802.16 (commonly referred to as WiMAX) may be available, or connectivity in accordance with Bluetooth may be available.

It will be appreciated that the electronic device 10 may be capable of communicating using more than one standard and the illustrated radio circuit assembly 24 and antenna assembly 26 represent the hardware and functionality for each desired standard (e.g., there may be one or more than one radio transceiver and/or antenna as part of the electronic device 10). This type of electronic device 10 may be referred to as a multimode mobile station, or MS. For simplicity of the appending figures, the electronic device 10 may sometimes be referred to by the designator MS and the servers may sometimes be referred to by the designator DB.

Each of the networks 18 may allow the electronic device 10 to communicate with the Internet 28. An operative interface also may exist between the servers 12 and the Internet 28. Therefore, regardless of which network 18 to which the electronic device 10 establishes an operative communication link, the electronic device 10 may be able to carry out a full range of communication activities. These activities include, for example, communicating with one or more of the servers 12 or some other device (e.g., another portable electronic device, another server that hosts an Internet website, etc.). Exemplary communications activities of the electronic device 10 include, but are not limited to, calls, data transfers, and the like. Calls may take any suitable form such as, but not limited to, voice calls and video calls. The calls may be carried out over a cellular circuit-switched protocol or may be in the form of a voice over Internet Protocol (VoIP) call. Data transfers may include, but are not limited to, receiving streaming content (e.g., streaming audio, streaming video, etc.), receiving data feeds (e.g., pushed data, podcasts, really simple syndication (RSS) data feeds), downloading and/or uploading data (e.g., image files, video files, audio files, ring tones, Internet content, etc.), receiving or sending messages (e.g., text messages, instant messages, electronic mail messages, multimedia messages), and so forth. This data may be processed by the electronic device 10, including storing the data in a memory 30, executing applications with a processing device 32 to allow user interaction with the data, displaying video and/or image content associated with the data, outputting audio sounds associated with the data, and so forth.

Overall functionality of the electronic device 10 may be controlled by a primary control circuit 34 that includes the processing device 32. The processing device 32 may execute code stored in a memory (not shown) within the control circuit 34 and/or in a separate memory (e.g., the memory 30) in order to carry out operation of the electronic device 10. For instance, the processing device 32 may be used to execute the connectivity function 14. The memory 30 may be, for example, one or more of a buffer, a flash memory, a hard drive, a removable media, a volatile memory, a non-volatile memory, a random access memory (RAM), or other suitable device. In a typical arrangement, the memory 30 may include a non-volatile memory for long term data storage and a volatile memory that functions as system memory for the control circuit 34. The memory 30 may exchange data with the control circuit 34 over a data bus. Accompanying control lines and an address bus between the memory 30 and the control circuit 34 also may be present.

Another component of the electronic device 10 may be a display 36 that is used to display visual information to a user. The electronic device 10 may include a speaker 38 and a microphone 40 to allow the user to carry out voice conversations. A user interface 42, such as a keypad and/or touch screen associated with the display 36, may be present to provide for a variety of user input operations.

The electronic device 10 may further include one or more input/output (I/O) interface(s) 44. The I/O interface(s) 44 may include one or more electrical connectors for connecting the electronic device 10 to another device (e.g., a computer) or an accessory (e.g., a personal handsfree (PHF) device) via a cable, and/or for connecting the electronic device 10 to a power supply. Therefore, operating power may be received over the I/O interface(s) 44 and power to charge a battery of a power supply unit (PSU) 46 within the electronic device 10 may be received over the I/O interface(s) 44. The PSU 46 may supply power to operate the electronic device 10 in the absence of an external power source.

The electronic device 10 also may include various other components. For instance, a camera (not shown) may be present for taking digital pictures and/or movies. Image and/or video files corresponding to the pictures and/or movies may be stored in the memory 30. A position data receiver (not shown), such as a global positioning system (GPS) receiver, may be involved in determining the location of the electronic device 10.

With additional reference to FIG. 2, each server 12 may be implemented as a computer-based system that is capable of executing computer applications (e.g., software programs), including the network access function 16. The network access function 16, and an affiliated network information database 48, may be stored on a non-transitory computer readable medium, such as a memory 50. The memory 50 may be a magnetic, optical or electronic storage device (e.g., hard disk, optical disk, flash memory, etc.), and may comprise several devices, including volatile and non-volatile memory components. Accordingly, the memory 50 may include, for example, random access memory (RAM) for acting as system memory, read-only memory (ROM), hard disks, optical disks (e.g., CDs and DVDs), tapes, flash devices and/or other memory components, plus associated drives, players and/or readers for the memory devices. To execute the network access function 16, the server 12 may include one or more processors 52 used to execute instructions that carry out a specified logic routine(s). The processor 52 and the components of the memory 50 may be coupled using a local interface 54. The local interface 54 may be, for example, a data bus with accompanying control bus, a network, or other subsystem.

The server 12 may have various video and input/output (I/O) interfaces 56 as well as one or more communications interfaces 58. The interfaces 56 may be used to operatively couple the server 12 to various peripherals, such as a display 60, a keyboard 62, a mouse 64, etc. The communications interfaces 58 may include for example, a modem and/or a network interface card. The communications interfaces 58 may enable the server 12 to send and receive data signals, voice signals, video signals, and the like to and from other computing devices via an external network. In particular, the communications interfaces 58 may connect the server 12 to the Internet 28.

Systems and methods of providing network access to the electronic device 10 using the assistance of one or more of the servers 12 now will be described in detail. The techniques may be implemented in a manner that is independent of network subscriptions or service plans of the electronic device 10, independent of predetermined or current network association of the electronic device 10, and independent of current radio technology used for wireless communications. The electronic device 10 may query the server 12 for information about available network options and, in turn, the server 12 may return a list of networks 18 that match communication parameters, capabilities and/or preferences of the electronic device 10, and that may service the electronic device 10 under any applicable government or regulatory agency rules. The returned information may include identity and/or connectivity information about connectivity devices 22 of the matching networks 18 that are within communication range of the electronic device 10. The electronic device 10 may query more than one of the servers 12 for available network options to gather neighborhood network information from plural sources that offer different or overlapping services. In one embodiment, the electronic device 10 uses the returned information to determine which network 18 to connect with in order to carry out wireless communications. The determination may include selection of a specific connectivity device 22.

In one embodiment, the electronic device 10 may communicate with a proxy server to request information regarding available network options. The proxy server may be one of the servers 12. The proxy server may collect information from multiple servers 12 or other services on behalf of the electronic device and return the collected information to the electronic device 10 in a consolidated manner. Also, the proxy server may analyze the collected information to narrow the results to the most suitable network options for the electronic device 10.

In addition to providing available network option information, the server 12 may provide the electronic device 10 with information that is used by the electronic device 10 to determine when to re-query the server for available network options. This information may be in the form of an amount of time or in the form of a distance from a current location of the electronic device 10. In one embodiment, the techniques do not include an active information exchange between the networks 18 (or the connectivity devices 22 of the networks 18) and the server 12 for the server 12 to generate the information that is provided to the electronic device 10. Rather, the database 48 may contain sufficient information to generate the information.

It is noted that IEEE 802.21 includes techniques to collect a list of available networks at a location of a wireless device from an information server. But IEEE 802.21 has several limitations addressed by the techniques described in this document. For instance, IEEE 802.21 does not account for several device capabilities and characteristics when creating a neighborhood network list for a device. One of the prominent device characteristics not addressed by IEEE 802.21 is power save features in radio devices. In addition, IEEE 802.21 services are network centric in that the services relate to one network or one type of network, and the network is aware of the presence of the electronic device for which the service is provided. In contrast, the server(s) 12 may be unassociated with the networks 18, and offer services to electronic devices that may be unassociated with and without an access link with the networks 18. Therefore, the electronic device 10 need not be provisioned to natively operate with any of the networks 18. Also, the servers 12 may be independent of the networks 18 and may offer the electronic device 10 information regarding different classes (e.g., types) of networks 18.

Prior to associating with one of the networks 18, the electronic device 10 may communicate with one or more of the servers 12 through any available communication pathway, which may include use of one of the networks 18 for the limited purpose of establishing communication with the server(s) 12.

The electronic device 10 may register with one or more servers 12. The registration may include transmitting a device capabilities and network preferences to the server(s) 12 in the form of a registration request. The registration request may include one or more of the following information elements:

Device Parameter
    Current location in a format compatible with the server
    Type of location tracking supported by the electronic device
        e.g. GPS, Assisted GPS (A-GPS), Skyhook
    Speed and direction of movement, if applicable Electronic device decision making capability
- Based on processing power or features available in the electronic device Each radio protocol or interface standard supported by the electronic device
- 802.11, WiMax, GPS, WCDMA, etc.

Parameters for each radio protocol or interface standard supported by the electronic device
- EIRP
  - Dependent on electronic device mode of operation
- Security
  - WPA, WPA2, etc.
- Band(s) of operation
  - VHF, UHF, ISM, . . .
- Bandwidth support
  - 5 MHz, 10 MHz, . . .
- Support channel bonding
  - Primary channel, Secondary channel(s)
- Power Save
  - 802.11 (e.g. PSMP)

Preferred communication device 22 or network 14
- A specific network service provider (e.g., a specified company's network)
- A specific connection device 22 or a specific network 18

Mode of operation (if multiple modes supported, as in white space)
- VHF, UHF Personal/Portable device: Mode I List of sensed connectivity devices 22 in the neighborhood of the electronic device, which may include link information Resource (e.g. bandwidth) requirement or preference
- e.g. 2 Mbps (average)

Subscription info
- A specific network service provider (e.g., a specified company)

Network Preference
- Cost
- Throughput
- Distance
- Preferred connectivity device(s) or network
- Power save or power consumption
- Security Current network association
- 3G/4G, network service provider, SSID User driven or electronic device driven connectivity decision making or server driven connectivity decision making for roaming In response to the registration request, the server 12 responds with a registration reply. The registration reply may indicate whether the registration was successful or failed. After a successful initial registration, the electronic device 10 may periodically update its registration information with the server 12 to keep a corresponding entry in the information stored by the server 12 in an active state. The periodic update may include updating any dynamic elements of the registration request that may have changed value since the initial registration or the last update.

After a successful initial registration, the electronic device 10 also may request information regarding available network resources to which the electronic device 10 may connect for the current location of the electronic device 10, which is referred to as neighborhood network for the electronic device 10. The information may be requested by transmitting a network information request to the server 12 to commence a network information exchange. In reply, the server 12 may return a connectivity device 22 candidate list to the electronic device 10. The connectivity device 22 candidate list may be in the form of connection information for specific connectivity devices 22. Alternatively, the returned candidate list may, more generally, include connectivity information for networks.

The request from the electronic device 10 for a list of available network resources for the current location of the electronic device 10 may be based on the plurality of parameters and operating preferences identified in the registration request and in the network information request. The network information request may include any dynamic elements of the registration request that may have changed value since the initial registration or the last registration update. In addition, the network information request may include one or more preference elements that are used by the server 12 to identify available network options in the vicinity of the electronic device 10. Exemplary elements included in the network information request include:

Operating parameters for each radio or network protocol supported by the electronic device;

Network preference in terms of a preference for a specific network (e.g., a network operated by a preferred network service provider) and/or a preference for a type of network;

Preferences for power consumption or savings, communication range, cost (e.g., financial charges for network use), and/or throughput;

Preferences for whether decisions regarding which connectivity device 22 to use are made at the electronic device 10 or at the server 12;

Information regarding device parameters and supported radio features;

A current location of the electronic device 10; and

Decision making capability of the electronic device 10 in terms of computing power and software resident on the electronic device 10 for execution.

After receiving a network information request from the electronic device 10, the server 12 may use the location of the electronic device 10 to identify the neighborhood network for the electronic device 10. For instances, connectivity devices 22 that are in the neighborhood network may be determined using EIRP of the electronic device 10 and the EIRP of connectivity devices 22 that are known from the database 48 to be in potential communication range of the electronic device 10. In addition, a terrain model and/or a path propagation model may be used to determine the networks 18 and connectivity devices 22 in the neighborhood network of the electronic device 10.

Initially, the server 12 may create a preliminary connectivity device 22 candidate list that includes the connectivity devices 22 that are in connectivity range of the electronic device 10 and that are operationally compatible with the electronic device 10. For instance, the preliminary candidate list may include connectivity devices 22 that satisfy operational requirements of the electronic device as identified during the registration process. As such, the connectivity devices 22 in the candidate list are compatible with the radio technologies supported by the electronic device 10, operate in the bands supported by the electronic device 10, and account for mode of operation of the electronic device 10 (mode of operation may be most relevant for white space channels). In addition, the connectivity devices 22 in the candidate list may support electronic device 10 security parameters, power save preferences, and any other operational criteria to support basic communication between the electronic device 10 and the connectivity device 22.

After establishing the preliminary candidate list, the list of connectivity devices 22 may be further reduced based on preferences of the electronic device 10 as determined during the registration process and/or from the network information request. The results after applying the preferences of the electronic device 10 may be referred to as a secondary candidate list. The secondary candidate list may include any number ("n") of connectivity devices 10 that may be suitable for the electronic device 10. This list of connectivity devices 10 may be transmitted to the electronic device 10 for further decision making in terms of which connectivity device 22, and hence which network 18, to use for wireless communications. In one embodiment, before transmission to the electronic device 10, the secondary candidate list may be further shortened and/or ranked based on one or more parameters, such as one or more of: distance between connectivity device 22 and electronic device 10; expected throughput; cost to the user of the electronic device 10; preferred connectivity device 22 or network 18; quality of service; and power save criteria.

Figure 3:
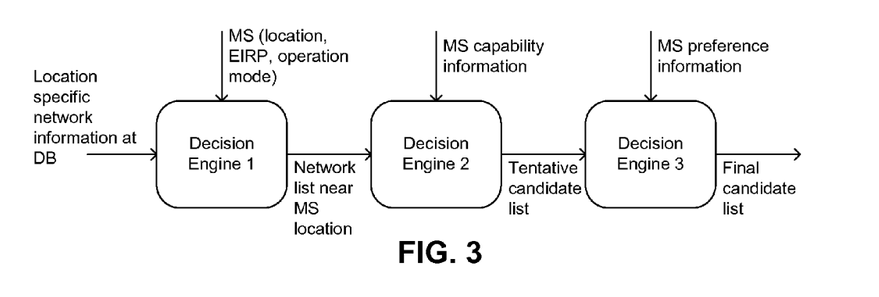
FIG. 3 is an exemplary process flow carried out by the network data server.

In one embodiment, the reply to the network information request may be in the form of a network information response that is transmitted from the network 12 to the requesting electronic device 10. In one embodiment, the network information response (e.g., candidate list) may include the following information, where (i) represents an incremented variable for each network 18 being identified in the response, (j) represents an incremented variable for each connectivity device 22 being identified for a corresponding one of the identified networks 18, and (k) represents an incremented variable for each radio communication option (e.g., operational channel) for each connectivity device 22 being identified in the response:

Network ID (i)
  Connectivity Device ID (j)
    Radio connectivity option (k)
      Association parameters
        Channel of operation (primary channel if bonding is used)
        Bandwidth of operation (list of channels if bonding is used)
        Technology used (e.g., WiMax, WiFi, etc.)
      Expected throughput.
        Min(wireless link, backhaul link)
      Match to one or more electronic device preferences
      Distance to electronic device
      Power save support
      Cost
      Quality of service
      Etc.
  Next request threshold
    Distance from current location in which to send a new network information request
    Time at which to send a new network information request With additional reference to FIG. 3, illustrated are logical steps carried out by the server 12 to process a network information request for the electronic device 10 using the capability, preference and location information for the electronic device 10. As an alternative to generating and transmitting a list of candidate connectivity devices 22, the server 10 may select one connectivity device 22 (or, more generally, one network 18) and transmit connection information for the selected connectivity device 22 to the electronic device 10. This alternative may be used when the electronic device 10 is not capable or not configured to determine which connectivity device 22 to use from a list a candidate connectivity devices 22, or when a determination has been made to have the server 10 make the connectivity device 22 selection on behalf of the electronic device 10 (e.g., to assist in roaming of the electronic device 10).

In addition to providing connectivity information for one or more connectivity devices 10, the server 12 may transmit information to the electronic device 10 that is used by the electronic device 10 to determine when to transmit another network information request to the server 12. This information may be in the form of a next request threshold in the form of a distance value (e.g., 50 feet, 200 feet, a half mile, a mile, etc.) and/or a time value (e.g., 10 minutes, 30 minutes, an hour, etc.). If the electronic device 10 travels from its current location an amount equaling a distance from the distance value, the electronic device 10 may transmit a new network information request to the server 12. Similarly, if an amount of time equaling the time value elapses, the electronic device 10 may transmit a new network information request to the server 12.

The time or distance next request threshold may be selected by the server 12 to assist the electronic device either stay connected to a favorable network 18 (e.g., a network that meets or exceeds electronic device 10 preferences for throughput, cost, power consumption, quality of service, or other criteria) or find a new network 18 if the current network 18 is not favorable in terms of electronic device 10 preferences for throughput, cost, power consumption, quality of service, or other criteria. If connected to a favorable network 18 or the electronic device 10 is not travelling or traveling relatively slowly for the communication range of the current connectivity device 22, then the distance for re-requesting connectivity information may be relatively far. If connected to an unfavorable network 18 or the electronic device 10 is travelling relatively quickly for the communication range of the current connectivity device 22, then the distance for re-requesting connectivity information may be relatively short. Similarly, if connected to a favorable network 18 or the electronic device 10 is not travelling or traveling relatively slowly for the communication range of the current connectivity device 22, then the amount of time for re-requesting connectivity information may be relatively long. If connected to an unfavorable network 18 or the electronic device 10 is travelling relatively quickly for the communication range of the current connectivity device 22, then the amount of time for re-requesting connectivity information may be relatively short.

The time or distance next request threshold may be further selected by the server 12 to assist the electronic device 10 maintain its ability to carry out wireless communications, especially when travelling and there is a possibility is travelling outside the communication range of the current connectivity device 22 or network 18. For this purpose, the time and distance may be based, at least in part, on the speed and/or direction of travel of the electronic device 10.

The distance or time next request threshold may be determined by the sever based on information that is maintained by the server 12 about the capabilities and preferences of the electronic device 10 and about the networks 18, including the constituent connectivity devices 22 of the networks 18. As an example, based on the information maintained by the server 12 and predicted movement of the electronic device 10, the server 12 may determined that the electronic device 10 may be able to communicate with a different, more favorable network 18 if the electronic device 10 moves a certain distance in a certain range of directions.

Figure 4:
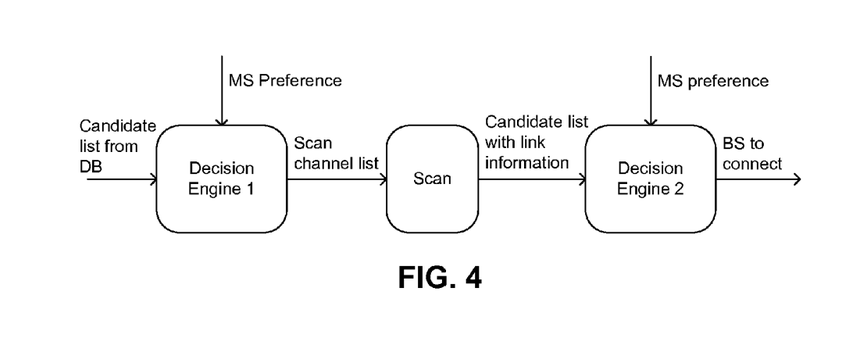
FIG. 4 is an exemplary process flow carried out by the electronic device.

With additional reference to FIG. 4, illustrated are logical steps carried out by the electronic device 10 to process a network information response and select a communication device 22 for wireless communications. When the electronic device 10 receives the candidate list from the server 10, the electronic device 10 may use its preferences to further shorten the list of candidate connectivity devices 22. In one embodiment, the preferences used in this step may be preferences that are not shared with the server 12. Rather, these preferences may be useful as part of an analysis of actual link information with the connectivity devices 22.

The electronic device 10 may scan a channel occupied by each of the candidate connectivity devices 22 from the shortened list to quantify the quality of the link to each connectivity device 22. Then, the electronic device 10 may employ a decision engine to select one of the connectivity devices 22. Thereafter, the electronic device 10 may associate with the selected connectivity device 22 (e.g., by using appropriate handshaking for the selected communication device 22) and carry out wireless communications.

Figure 5:
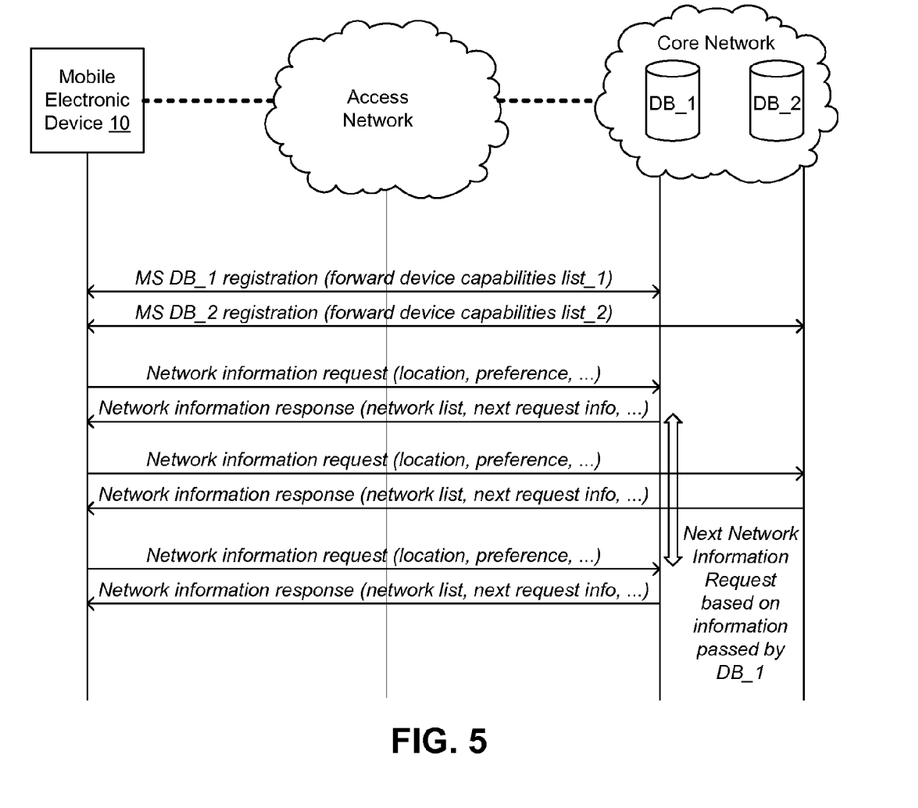
FIG. 5 is an exemplary call flow between the electronic device and one or more network data servers.

With additional reference to FIG. 5, illustrated is an exemplary call flow between the electronic device 10 and two servers 12 to carry out the above-described functions.

Depending on security preferences of the electronic device 10 and/or configuration of the network 18 with which the electronic device 10 may associate, security credentials to establish secured connection between the network 18 and the electronic device 10 may be obtained by the electronic device 10. In one embodiment, the security credentials may be supplied to the electronic device from the server 12. The security credentials may be take any appropriate form including, for example, a certificate, a username and password, a phase-shifting key (PSK) passphrase, a key (e.g., public key, shared key or private key), or similar data item or items.

In one embodiment, following registration of the electronic device 10 with the server 12, the connectivity function 14 running in the electronic device and the network access function 16 running in the server 12 may establish a secure tunnel for further communications between the electronic device 10 and the server 12. The tunnel may be created in an application layer and may be transparent to an underlying physical layer link. Once the secure tunnel is in place, the electronic device 10 may receive security credentials for one or more networks 18, or one or more specific connectivity devices 22, from the server 12 using the tunnel. The obtained security credentials are not exposed to the user of the electronic device 10. The application layer in the electronic device 10 may apply the security credentials below, but not above, the application layer in the protocol stack.

In one embodiment, the server 10 may maintain security credentials of networks 18 in a given geographic area. Alternatively, the sever 10 may obtain security credentials from one or more networks 18 on behalf of an electronic device 12. In situations where the sever 12 is not aware of the security credentials for one of the networks 18, or a specific connectivity device 22, the server 10 may set the security credentials to "unknown". The "unknown" security credential setting also may be used for networks 18 or connectivity devices 22 that use authentication above the application layer.

In one embodiment, the security credentials for a selected network 18 or connectivity device 22 are obtained by transmitting a roaming commit request to the server 12. Depending on a preference setting of the electronic device 10 or the credentials to be supplied, the sever 12 may return the credentials of a given connectivity device 22 or an entire network 18 in a roaming commit response. In the case of transmission of security credentials for a connectivity device 22, and if the security credentials are not the same across the corresponding network 18, then the server 12 may returns a list of security credentials for plural connectivity devices 22 belonging to the network 18. The server 12 also may return security credentials for multiple networks 18 serving the location of the electronic device 10.

Figure 6:
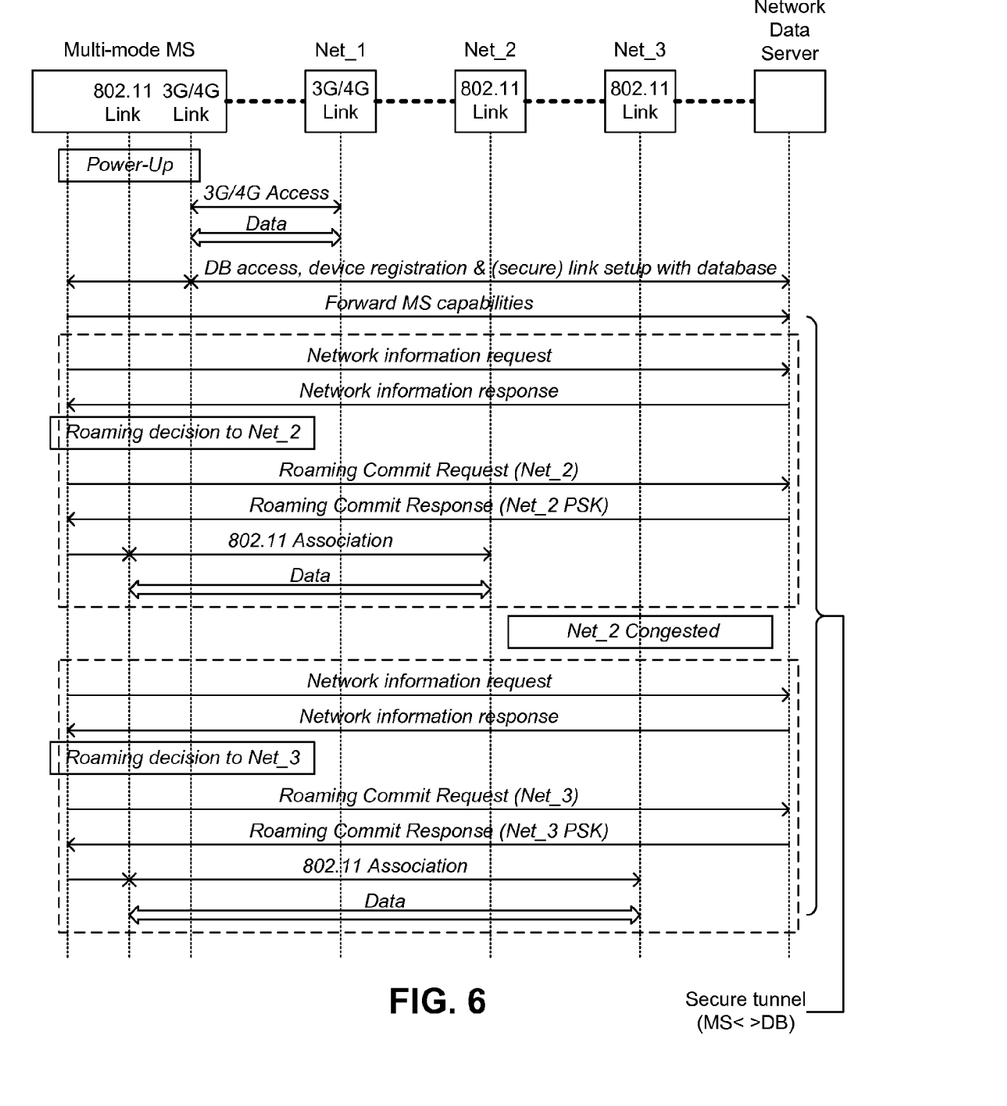
FIG. 6 is an exemplary call flow for the establishment of secure communications between the electronic device and a network.
Figure 7:
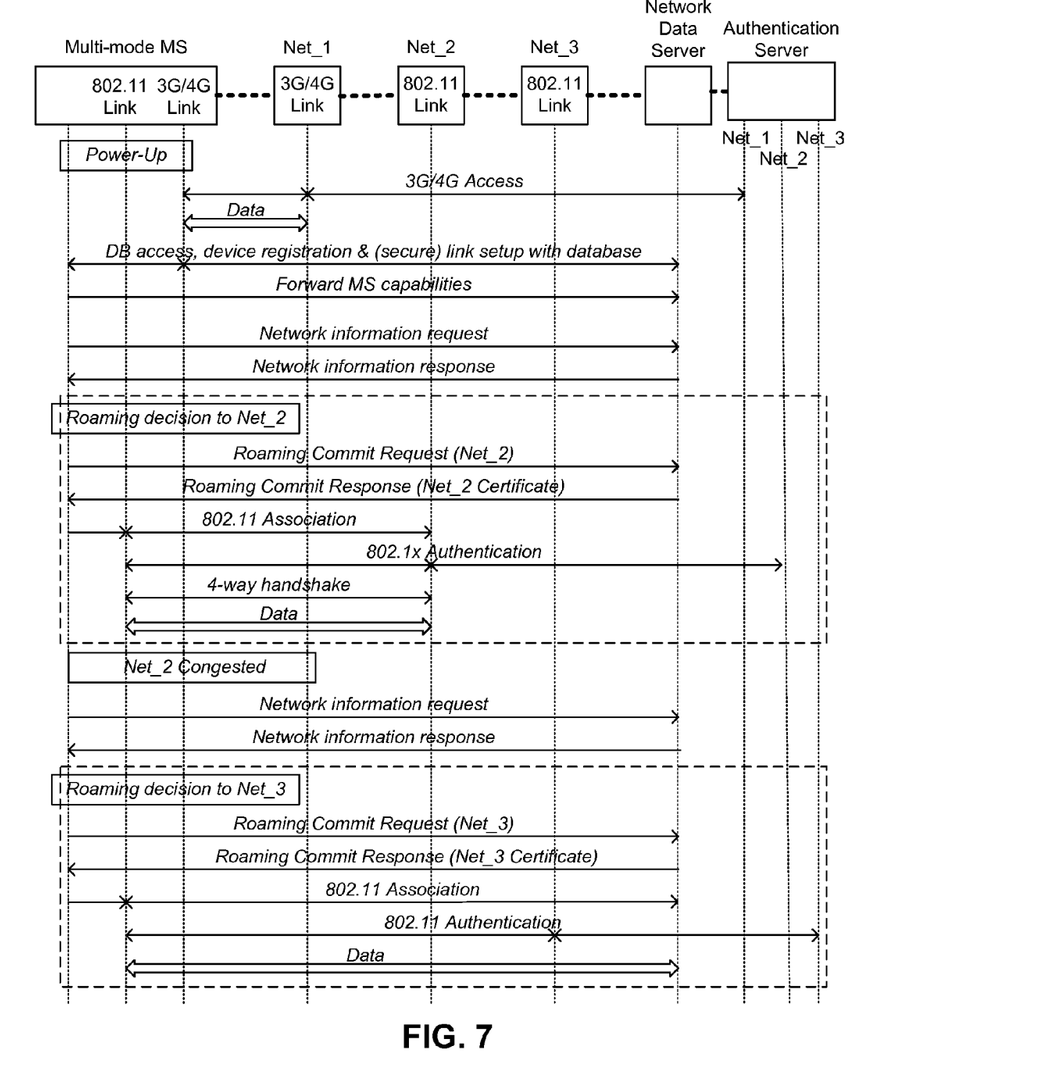
FIG. 7 is another exemplary call flow for the establishment of secure communications between the electronic device and a network.

FIG. 6 illustrates an exemplary call flow for obtaining security credentials for PSK based network access and FIG. 7 illustrates an exemplary call flow for obtaining security credentials for certificate based network access. In both of these exemplary flows, one network (Net_2) is found to be congested and the electronic device seeks access to another network (Net_3).

In one embodiment, the roaming commit request to obtain security credentials may be sent after the network information exchange with the server 12 and determination of which connectivity device 22 to use has been made. Alternately, the electronic device 10 may proactively send a roaming commit request based on a prior network information exchange with the server 10 and where the electronic device 10 has knowledge of a preferred connectivity device 22 in a known location.

Although certain embodiments have been shown and described, it is understood that equivalents and modifications falling within the scope of the appended claims will occur to others who are skilled in the art upon the reading and understanding of this specification.

What is claimed is:

1. A method of providing information about available network connectivity options to a radio device with a server, comprising:
   providing information concerning network connectivity options to the radio device in response to a network information request that is received from the radio device, the network connectivity options being information about at least one network that provides wireless communication services for the radio device to engage in wireless communications with remote devices; and
   providing a next request threshold to the radio device, the next request threshold specifying a time or a distance from a current location of the radio device at which the radio device is to transmit another network information request, the next request threshold established by the server to assist the radio device in staying connected to a favorable network by way of a network connectivity device for the favorable network or find a new network, the establishing of the next request threshold including selecting the time or distance based on preferences of the radio device for one or more of throughput, cost of network access, power consumption, and quality of service.

2. The method of claim 1, wherein the selecting of the time or distance is further based on at least one of speed or direction of travel of the radio device.

3. A method of providing information about available network connectivity options to a radio device with a server, comprising:
   providing information concerning network connectivity options to the radio device in response to a network information request that is received from the radio device, the network connectivity options being information about at least one network that provides wireless communication services for the radio device to engage in wireless communications with remote devices; and
   providing a next request threshold to the radio device, the next request threshold specifying a time or a distance from a current location of the radio device at which the radio device is to transmit another network information request, the next request threshold established by the server to assist the radio device in staying connected to a favorable network by way of a network connectivity device for the favorable network or find a new network, the establishing of the next request threshold including selecting the time or distance based on at least one of speed or direction of travel of the radio device.

* * * * *